United States Patent [19]

Gooderham

[11] Patent Number: 5,316,213
[45] Date of Patent: May 31, 1994

[54] CONDENSATE TRAP

[75] Inventor: Roy J. Gooderham, Cheltenham, United Kingdom

[73] Assignee: Spirax-Sarco Limited, Cheltenham, United Kingdom

[21] Appl. No.: 59,566

[22] Filed: May 12, 1993

[30] Foreign Application Priority Data

May 14, 1992 [GB] United Kingdom ............... 9210352.2

[51] Int. Cl.5 ................................................ F16T 1/10
[52] U.S. Cl. ..................................... 236/58; 137/454.2
[58] Field of Search ................ 236/56, 58, 93 A, 99 J; 251/152; 137/454.2

[56] References Cited

U.S. PATENT DOCUMENTS

| 248,101 | 10/1881 | Lawson | 236/58 |
| 4,751,938 | 6/1988 | Kerns et al. | 251/152 X |

Primary Examiner—William E. Tapoicai
Attorney, Agent, or Firm—Willian Brinks Hofer Gilson & Lione

[57] ABSTRACT

A condensate trap (2) comprises a valve disposed within a casing comprising a peripheral wall (3) and end walls (6,7). Each end wall has an aperture (9,10) for the passage of fluid into and out of the casing, the end walls having mutually parallel flat end surfaces (14) for clamping between two flanges (5) in a fluid line (4). Connection means (11,12) external to the condensate trap (2) connect the flanges (5) allowing simple installation and removal of the trap (2) in existing fluid lines which include a flanged connection.

5 Claims, 2 Drawing Sheets

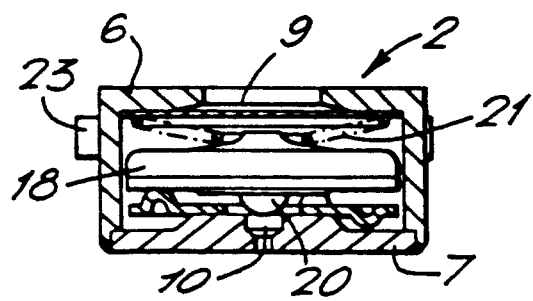
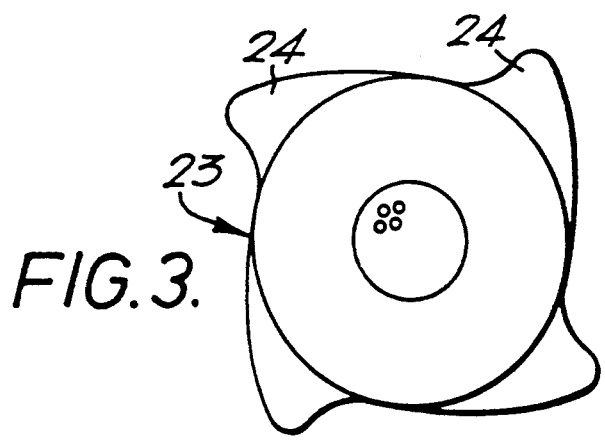

CONDENSATE TRAP

BACKGROUND OF THE INVENTION

This invention relates to condensate traps, and in particular to a condensate trap which can be easily inserted into an existing fluid line or removed from a fluid line for servicing, replacement, or permanent removal from the system.

A steam trap which is removable from a fluid line without displacing inlet and outlet fluid flow members is disclosed in GB 1289559. This steam trap comprises a venting valve disposed within a casing, in which the casing is provided with means for connection with the fluid line. This connection means comprises special flanges which must be fitted to the pipe ends to which the steam trap is to be connected.

SUMMARY OF THE INVENTION

According to the present invention there is provided a condensate trap comprising a valve disposed within a casing comprising a peripheral wall and oppositely disposed end walls, each end wall having an aperture for the passage of fluid into and out of the casing, the end walls having, on the outside of the casing, mutually parallel flat end surfaces which extend from the peripheral wall to the respective apertures, whereby the condensate trap is adapted for mounting in a fluid line by clamping between two flanges which are secured together by connection means situated externally of the condensate trap.

A condensate trap in accordance with the present invention can be installed in a fluid line having a flanged connection by releasing the connection means (such as bolts) which retain together the flanges of the fluid line, and inserting the condensate trap between the flanges. The condensate trap is then secured in position by the clamping action of the connection means which interconnect the flanges. The flanges may be standard flanges, and no separate connection means are required for the condensate trap itself; in other words, the trap is "connectionless". The peripheral wall of the casing is preferably provided with an outwardly extending centering flange, the outer edge of which is adapted to abut flange bolts serving as the connection means in order to centre the condensate trap with respect to the flange bolts.

BRIEF DESCRIPTION OF THE DRAWINGS

FIG. 2 shows, in more detail, the condensate trap of FIG. 1; and

FIG. 3 is an end view of the condensate trap of FIG. 2.

DETAILED DESCRIPTION OF THE INVENTION

Figure 1:
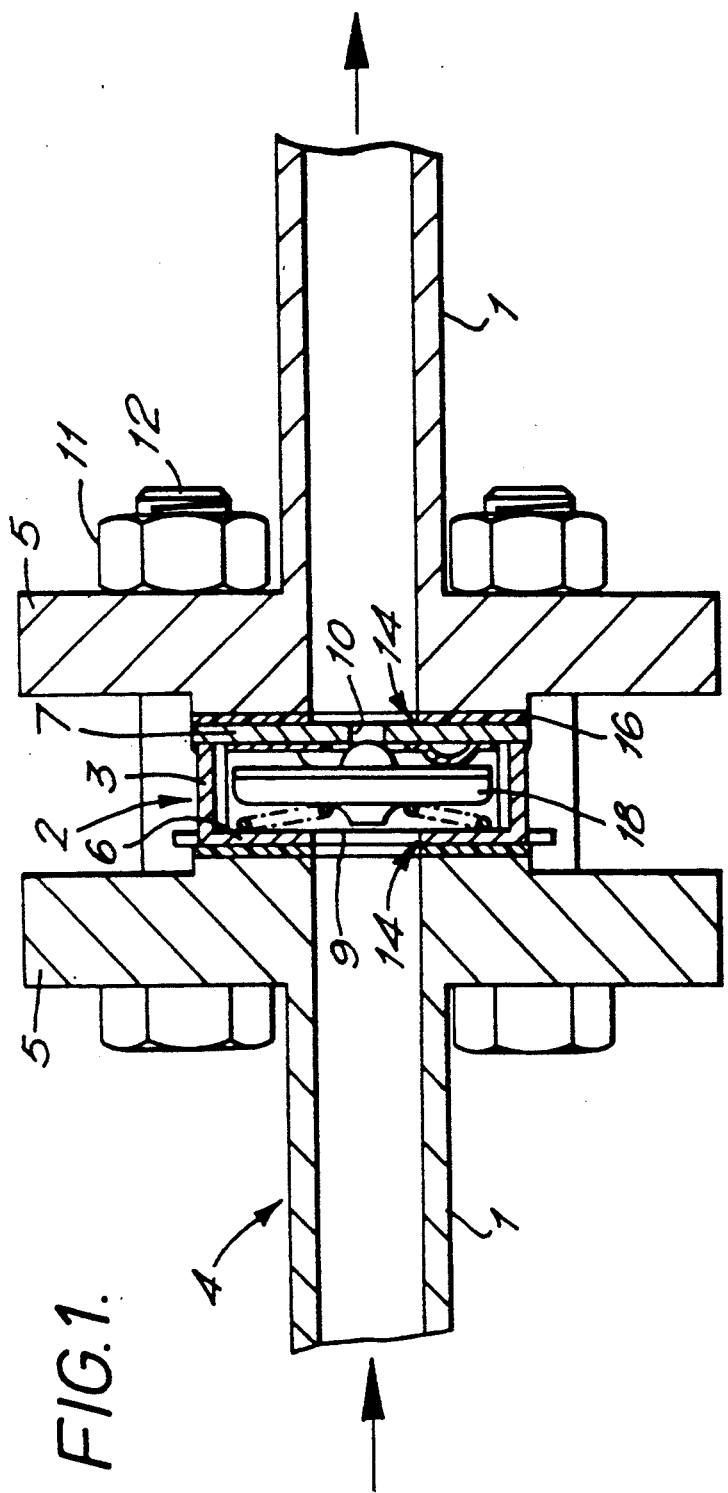
FIG. 1 shows a condensate trap installed in a fluid line.

As shown in FIG. 1, a condensate trap 2 is situated in a fluid line 4 comprising pipes 1. The ends of the pipes 1 are provided with flanges 5 which have corresponding holes which receive bolts 12 secured by nuts 11. The condensate trap 2 comprises a valve 8 disposed within a casing comprising a peripheral wall 3 and oppositely disposed end walls 6,7, at the fluid inlet and outlet side of the condensate trap. Each end wall 6,7 has an aperture 9,10 respectively for the passage of fluid into and out of the casing. The end walls 6,7 have, on the outside of the casing mutually parallel flat end surfaces 14 which extend from the peripheral wall 3 to the respective apertures 9,10. Gaskets 16 are clamped between the flanges 5 and the flat end surfaces 14.

As shown in FIG. 3, the peripheral wall 3 of the condensate trap 2 is provided with a centering flange 23 having ramp surfaces 24.

The valve of the condensate trap shown in FIG. 2 comprises a capsule 18 containing a volatile fluid. According to the phase of the fluid in the capsule 18, which depends on the ambient pressure and temperature, a valve member 20 is moved into and out of a position in which it blocks the aperture 10 provided in the end wall 7 at the outlet side of the condensate trap 2. A spring 21 is provided to accommodate any additional movement between the valve member 20 and the capsule 18 after the valve member 20 engages the aperture 10.

The condensate trap 2 is easily installed in an existing fluid line including a flanged connection. Thus, referring to FIG. 1, the connecting bolts 12 are removed and the flanges 5 of the connection separated. Owing to the small width of the condensate trap 2, the necessary displacement of the flanges 5 to accommodate the trap can be achieved by movement of the pipework. The condensate trap 2, with the gaskets 16 at each end, is inserted into the gap between the flanges 5, and the bolts are then replaced. Longer bolts may need to be installed, but no special connection members or adaption flanges, or any other part of the fluid line are required.

The condensate trap may be rotated before tightening the bolts until the ramp surfaces 24 of the centring flange 23 abut the bolts 12. This causes the condensate trap to be centred with respect to the fluid line.

Similarly, the condensate trap can be removed easily, simply by removing the nuts 11 and bolts 12 and sliding the condensate trap out from between the flanges 5. If the condensate trap is to be removed permanently, the flanges 5 can be brought together and secured by the nut and bolt connections. In this way no connection member need replace the condensate trap to enable reconnection of the pipe ends.

When the trap is installed, fluid enters the inlet aperture 9 of the casing and surrounds the capsule 18. If condensate is present, the resulting lower temperature causes the volatile fluid in the capsule 18 to condense so that the valve member 20 moves away from the aperture 10 in the end wall 7, and condensate can flow across the valve. When steam enters the casing, when all the condensate has been discharged, the temperature of the condensate trap rises, which in turn raises the temperature of the fluid contained in the capsule 18, and causes it to vaporise. The causes the valve member 20 to block off the aperture in the end wall 7 to prevent steam from escaping from the fluid line 4.

While the embodiment shown in the Figures utilizes a balanced pressure steam trap device, other forms of condensate trap could be used.

What is claimed is:

1. A condensate trap comprising:
   a casing comprising a peripheral wall and oppositely disposed end walls which define a valve chamber, an aperture being provided in each end wall for the passage of fluid into and out of the valve chamber, the end walls having, on the outside of the casing, mutually parallel flat end surfaces which extend from the peripheral wall to the respective apertures; and a valve disposed within the valve chamber, whereby the condensate trap is adapted for mounting in a fluid line by clamping between two flanges which are secured together by flange bolts situated externally of the condensate trap, the peripheral wall being provided with outwardly extending centering means comprising a plurality of cam lobes, each of which has a convex ramp surface for engagement with a respective one of the flange bolts in order to center the condensate trap with respect to the flange bolts.

2. A condensate trap as claimed in claim 1, in which the end walls are permanently secured to the peripheral wall.

3. A fluid line comprising:
a condensate trap according to claim 1;
two pipe elements, each having an end flange; and
connection means which is situated externally of the condensate trap, in which the condensate trap is clamped between the two end flanges, which abut the flat end surfaces of the condensate trap, and which are secured together by the connection means.

4. A fluid line as claimed in claim 3, in which the connection means comprises bolts.

5. A fluid line as claimed in claim 3, in which sealing gaskets are disposed between the end surfaces and the respective flanges.

* * * * *